(12) United States Patent
Saito

(10) Patent No.: US 8,849,534 B2
(45) Date of Patent: Sep. 30, 2014

(54) VEHICLE CONTROL SYSTEM CONTROLLING EXERTION OF BRAKING FORCE ON WHEEL

(75) Inventor: Tatsuya Saito, Chiryu (JP)

(73) Assignee: Denso Corporation, Kariya (JP)

( * ) Notice: Subject to any disclaimer, the term of this patent is extended or adjusted under 35 U.S.C. 154(b) by 510 days.

(21) Appl. No.: 12/713,997

(22) Filed: Feb. 26, 2010

(65) Prior Publication Data

US 2010/0228460 A1 Sep. 9, 2010

(30) Foreign Application Priority Data

Mar. 4, 2009 (JP) ................................. 2009-050118

(51) Int. Cl.
*B60T 7/00* (2006.01)
*B60T 7/12* (2006.01)
(52) U.S. Cl.
CPC ...................................... *B60T 7/12* (2013.01)
USPC ............... 701/70; 701/99; 701/112; 701/113
(58) Field of Classification Search
USPC ..................... 701/70, 99, 112, 113
See application file for complete search history.

(56) References Cited

U.S. PATENT DOCUMENTS

| | | | | | |
|---|---|---|---|---|---|
| 4,871,215 | A | * | 10/1989 | Takayama ..................... | 303/191 |
| 5,139,315 | A | * | 8/1992 | Walenty et al. ............... | 303/162 |
| 6,702,718 | B2 | | 3/2004 | Tani et al. | |
| 6,860,570 | B2 | * | 3/2005 | Yanaka et al. .................. | 303/20 |
| 6,997,521 | B2 | * | 2/2006 | Jensen et al. ...................... | 303/3 |
| 7,140,697 | B2 | * | 11/2006 | Koga et al. ...................... | 303/20 |
| 7,464,996 | B2 | * | 12/2008 | Saewe et al. ..................... | 303/89 |
| 8,086,384 | B2 | * | 12/2011 | Nakayama ....................... | 701/79 |
| 8,090,499 | B2 | * | 1/2012 | Tamai ............................ | 701/38 |
| 2007/0054773 | A1 | * | 3/2007 | Braun et al. ..................... | 477/4 |
| 2007/0170775 | A1 | * | 7/2007 | Uchimura et al. ............ | 303/112 |
| 2007/0173984 | A1 | * | 7/2007 | Nakayama ........................ | 701/1 |
| 2009/0192019 | A1 | * | 7/2009 | Groner et al. .................. | 477/195 |
| 2010/0076656 | A1 | * | 3/2010 | Hiyoshi et al. .................. | 701/70 |
| 2011/0136625 | A1 | * | 6/2011 | Yu et al. ......................... | 477/185 |
| 2011/0190095 | A1 | * | 8/2011 | Bollig et al. .................. | 477/203 |

FOREIGN PATENT DOCUMENTS

| | | |
|---|---|---|
| JP | A-2002-221059 | 8/2002 |
| JP | A-2008-044443 | 2/2008 |

* cited by examiner

*Primary Examiner* — John Q Nguyen
*Assistant Examiner* — Michael Whalen
(74) *Attorney, Agent, or Firm* — Oliff PLC

(57) ABSTRACT

A vehicle control system is provided which is designed to stop or restart an engine automatically. The system is equipped with a vehicle speed determining circuit which determines the speed of the vehicle and has a dead zone around where a real speed of the vehicle is zero. The vehicle speed determining circuit has a characteristic in which when falling in the dead zone, the determined speed shows zero. When the determined speed is zero, and the real speed is expected to have dropped to zero, the system applies a first braking force to the wheel to keep the vehicle stopped. When the determined speed has become zero following the automatic stop of the engine, the system applies a second braking force smaller in magnitude than the first braking force to the wheel, thereby decelerating the vehicle slowly to avoid unexpected sudden deceleration.

17 Claims, 4 Drawing Sheets

VEHICLE CONTROL SYSTEM CONTROLLING EXERTION OF BRAKING FORCE ON WHEEL

CROSS REFERENCE TO RELATED DOCUMENT

The present application claims the benefit of Japanese Patent Application No. 2009-50118 filed on Mar. 4, 2009, the disclosure of which is incorporated herein by reference.

BACKGROUND OF THE INVENTION

1. Technical Field of the Invention

The present invention relates generally to a vehicle control system designed to control exertion of braking force on wheels of a vehicle when being at a stop.

2. Background Art

Japanese Patent First Publication No. 2008-44443 discloses a vehicle control system equipped with a hill holder device working to prevent the vehicle from accidentally rolling backward when the driver starts the vehicle on steep hills. This system is designed to keep the hydraulic braking pressure at a high level to apply the braking force to wheels of the vehicle when three conditions are all met: an inclination of the road surface is greater than a given value, the brake pedal of the vehicle is being depressed, and the speed of the vehicle is zero (0), and then continues to keep the hydraulic braking pressure after the driver releases the brake pedal to avoid the backward rolling of the vehicle when the drive starts the vehicle.

Most of vehicle speed sensors have a dead zone where a measured value of speed of the vehicle shows zero (0) around a zero real speed of the vehicle. The above vehicle control system may, therefore, encounter the problem that the speed of the vehicle is determined to be zero in error when the vehicle is braked while being running on the slope, so that the real speed of the vehicle drops, thus causing the hill holder device to exert a great braking force on the wheels, leading to sudden deceleration of the vehicle not expected by the driver.

The above problem is usually faced by systems equipped with no hill holder devices, but designed to apply the braking force to the wheels of the vehicle at rest.

SUMMARY OF THE INVENTION

It is therefore a principal object of the invention to avoid the disadvantages of the prior art.

It is another object of the invention to provide a vehicle control system which is designed to apply braking force to wheels of a vehicle when being at a stop and works as a braking controller to minimize or avoid sudden deceleration unexpected by a vehicle driver.

According to one aspect of the invention, there is provided a vehicle control system serving as a brake control system. The vehicle control system comprises: (a) a brake actuator which works to brake a wheel of a vehicle; (b) a vehicle speed determining circuit which works to determine a speed of the vehicle, the vehicle speed determining circuit having a dead zone around where a real speed of the vehicle is zero, the vehicle speed determining circuit having a characteristic in which when falling in the dead zone, the determined speed of the vehicle shows zero; and (c) a controller which operates in a stop mode, a restart mode, and a braking control mode selectively. When a given engine stop requirement is met during running of an engine of the vehicle, the controller enters the stop mode to stop the engine automatically. When a given engine restart requirement is met after stop of the engine, the controller enters the restart mode to restart the engine. When the determined speed of the vehicle is zero, the controller applies a first braking force to the wheel through the brake actuator. When the determined speed of the vehicle has become zero following the stop of the engine in the stop mode, the controller enters the braking control mode to apply a second braking force smaller in magnitude than the first braking force to the wheel.

The vehicle speed determining circuit, as described above, has the dead zone (e.g., 3 km/h or less) where the determined speed becomes zero (0). Thus, when the real speed has dropped to the dead zone after the engine is stopped automatically, the determined speed DS will become zero (0). At this time when the real speed does not yet become zero (0), the application of the first braking force to the wheel may result in sudden deceleration unanticipated by a vehicle driver. In order to avoid the above drawback, the controller controls the brake actuator to apply the second braking force to the wheel which is smaller in magnitude than the first braking force, thereby decelerating the vehicle slowly without sudden deceleration unexpected by the vehicle driver. Subsequently, the controller applies the first braking force to the wheel.

In the preferred mode of the invention, the controller performs the braking control mode for a given period of time since the determined speed dropped to zero (0). In other words, the controller applies the second braking force to decelerate the vehicle gradually for a period of time for which there is a high possibility that the real speed of the vehicle has not yet dropped to zero.

The given period of time is a time interval from when the determined speed becomes zero to when the real speed is expected to have dropped to zero.

The second braking force is a minimum possible braking force the brake actuator is permitted to exert on the wheel, thereby decelerating the vehicle most gradually.

The controller starts to apply the first braking force to the wheel when the real speed of the vehicle is expected to have dropped to zero and also starts to apply the second braking force to the wheel before the real speed of the vehicle is expected to have dropped to zero. Specifically, when the determined speed becomes zero after the stop of the engine, the controller first applies the second braking force (i.e., the smaller braking force) to the wheel and, when the vehicle is expected to have stopped, applies the first braking force (i.e., the greater braking force) to the wheel.

When the determined speed is zero, and it has been required to start the vehicle on a slope, the controller may have the vehicle start moving while the first braking force is being applied to the wheel. For example, when it is required to start the vehicle in the hill hold mode, the controller has the vehicle start moving when the first braking force is being applied to the wheel following application of the second braking force.

When the determined speed is zero, and it has been required to restart the engine, the controller may have the engine restart while the first braking force is being applied to the wheel.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
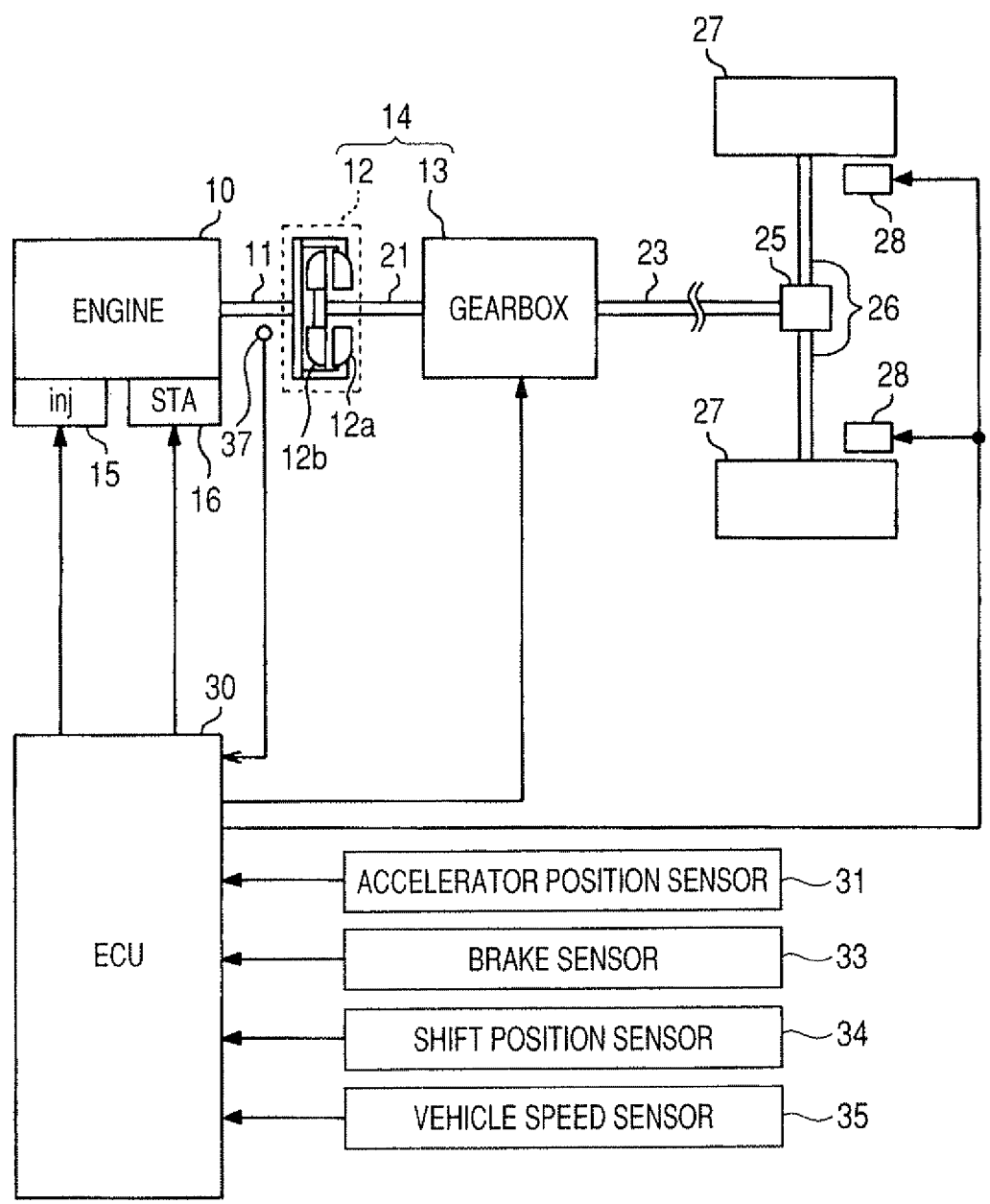
FIG. 1 is a block diagram which illustrates a vehicle control system according to the invention.

Referring to the drawings, particularly to FIG. 1, there is shown a vehicle control system according to the invention which is installed in an automotive vehicle equipped with an engine 10 and an automatic transmission 14.

The automatic transmission 14 includes a torque converter 12 and a gearbox 13. The gearbox 13 is coupled to the crankshaft 11 (i.e., an output shaft) of the engine 10 through the torque converter 12. The engine 10 is, for example, a multi-cylinder gasoline engine and equipped with injectors 15 and spark plugs, one for each cylinder thereof. The engine 10 has installed thereon a starter 16 to crank or give initial rotation to the engine 10 when it is required to start the engine 10. The engine 10 may alternatively be a diesel engine.

The torque converter 12 is made up of a pump impeller 12a coupled to the crankshaft 11, a turbine impeller 12b coupled to an input shaft 21 of the gearbox 13, and a one-way clutch, etc. The turbine impeller 12b rotates following rotation of the pump impeller 12a.

The bear box 13 is made up of a planetary gear drive, friction elements such as clutches or brakes, and a plurality of solenoid valves which controls the hydraulic pressure applied to the friction elements. Each of the solenoid valves is controlled in operation to establish engagement or disengagement of the friction elements to change a combination of gears to develop a selected gear ratio.

The automatic transmission 14 is designed to establish one of a parking (P) range, a reverse (R) range, a neutral (N) range, a drive (D) range, a second gear speed range, and a first gear speed range which is selected manually by the driver of the vehicle.

The gearbox 13 has an output shaft 23 coupled to driven wheels 27 through a differential gear 25 and a drive shaft 26. Each of the driven wheels 27 has installed thereon a brake actuator 28 which is controlled hydraulically through a hydraulic circuit (not shown) to apply a braking force to the driven wheel 27. Each of the brake actuator may alternatively be designed to be driven by an electric motor.

The vehicle control system also includes an electronic control unit (ECU) 30 which is implemented by a typical microcomputer and serves as a clutch controller. The ECU 30 also works to monitor output from various sensors, as will be described later, installed in the vehicle control system to control the quantity of fuel to be sprayed from each of the injectors 15 and perform engine control such as ignition control, control of the starter 16, and control of the brake actuators 28 for braking the wheels 27. The vehicle control system includes an accelerator position sensor 31, a brake position sensor 33, a shift position sensor 34, a vehicle speed sensor 35, an engine speed sensor 37. The accelerator position sensor 31 works to measure the position of the accelerator pedal (i.e., a driver's effort on the accelerator pedal). The brake position sensor 33 works to measure the position of a brake pedal (i.e., a driver's effort on the brake pedal). The shift position sensor 34 works to detect the position of a shift lever of the automatic transmission 14. The vehicle speed sensor 35 works to measure the speed of the vehicle equipped with this system. The engine speed sensor 37 works to measure the rotation speed of the crankshaft 11 to determine the speed of the engine 10. The outputs from these sensors are inputted to the ECU 30.

The ECU 30 and the vehicle speed sensor 35 serve as a vehicle speed determining circuit to determine the speed of the vehicle. The vehicle speed determining circuit has a dead zone in output characteristics thereof in which a determined value of the speed of the vehicle shows zero (0). The dead zone lies near where the real speed of the vehicle is zero (0). The dead zone is provided in a control task to be executed by the ECU 30 to calculate or determine the speed of the vehicle (which will also be referred to as a determined speed DS below) based on the output from the vehicle speed sensor 35 for ensuring the vehicle control safety. Specifically, when the value of the speed of the vehicle, as measured by the vehicle speed sensor 35, has dropped below a dead zone speed TS2 (e.g., 3 km/h), in other words, fell in the dead zone, the ECU 30 sets the determined speed DS to zero (0). The vehicle speed sensor 35 itself may have such a dead zone in output characteristics thereof in which the output shows zero (0) inevitably.

Idle stop control (also called automatic engine stop/restart control) to be executed by the ECU 30 will be described below.

Specifically, when engine stop requirements are met during running of the engine 10, the ECU 30 stops the engine 10 automatically. Subsequently, when engine restart requirements are met, the ECU 30 restarts the engine 10 automatically. The engine stop requirements include, for example, at least one of conditions in which the brake pedal has been depressed, and the speed of the vehicle has dropped below a given idle stop speed TS1. The engine restart requirements include, for example, at least one of conditions in which the brake pedal is not depressed when the engine 10 is at a stop, and the accelerator pedal has been depressed when the engine 10 is at a stop. The idle stop control is performed when the automatic transmission 14 is placed in a forward travel range (i.e., one of the D range, the second gear speed range, and the first gear speed range).

When the speed DS, as determined by the vehicle speed determining circuit (i.e., a combination of the ECU 30 and the vehicle speed sensor 35), shows zero (0), the ECU 30 enters a stop hold mode to apply given braking force TB2 to the wheels 27 through the brake actuators 28 to keep the vehicle stopped. This stop hold control includes the hill hold control which holds the vehicle (i.e., the brake) from moving backward when the driver starts to move the vehicle forward on the slope. For example, when the determined speed DS is zero, and it has been required to start the vehicle on a slope, the ECU 30 has the vehicle start moving while the braking force TB2 (i.e., a greater braking force) is being applied to the wheels 27. Additionally, when it has been requested to restart the engine 10, and the determined speed DS shows zero (0), the ECU 30 enters a start control mode to operate the brake actuators 28 to exert the braking force TB2 on the wheels 27 to hold the vehicle from starting undesirably. For example, when the determined speed DS is zero, and it has been required to restart the engine 10, the ECU 30 has the engine 10 restart while the braking force TB2 is being applied to the wheels 27. The braking force TB2 may differ between the stop hold mode and the start control mode. When the determined speed DS of the vehicle is not zero (0) upon the request of restart of the engine 10, the ECU 30 does not enter the start control mode and permits the vehicle to start in a normal operation mode.

Figure 2:
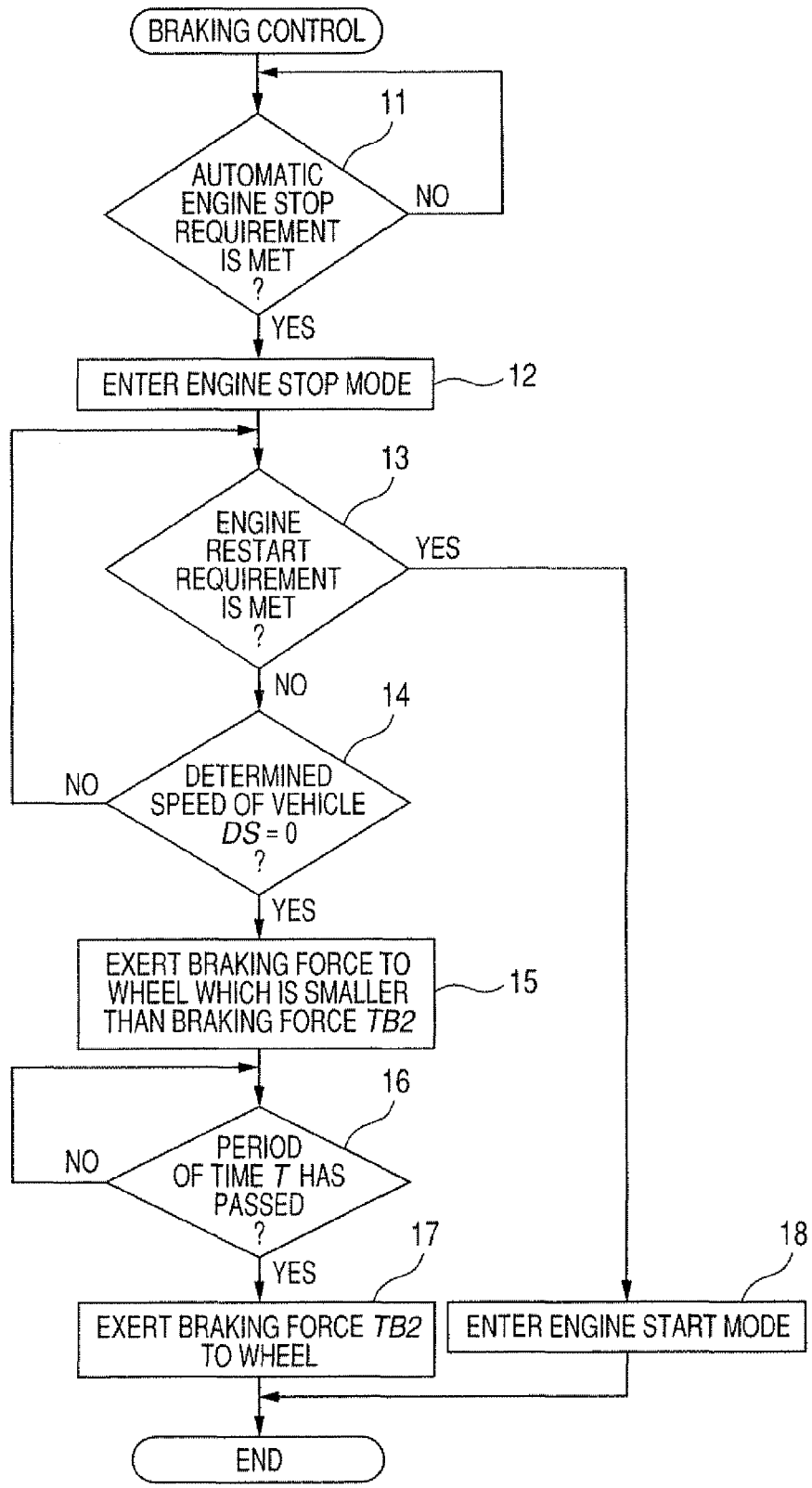
FIG. 2 is a flowchart of a braking control program to be executed by the vehicle control system of FIG. 1.

FIG. 2 shows a sequence of logical steps or program to be executed by the ECU 30 to control the braking of the wheels 27 using the brake actuators 28 when the speed of the engine 10 is decreasing in the automatic engine stop mode.

After entering the program, the routine proceeds to step 11 wherein it is determined whether the engine stop requirements are met of not. Specifically, the ECU 30 determines, as described above, whether the brake pedal has been depressed or not based on the output from the brake sensor 33 and whether the speed of the vehicle, as measured by the vehicle speed sensor 35, has dropped below the given idle stop speed TS1 or not. When the engine stop requirements are both met, the ECU 30 decides that the engine 10 should be stopped automatically. The idle stop speed TS1 is the speed of the vehicle at which the engine 10 is permitted to be stopped in safety when it is requested to stop the engine 10 during deceleration thereof and set to 20 km/h in this embodiment. This enables the engine 10 to be stopped before the vehicle is stopped completely, thus resulting in a decreased consumption of fuel.

If a YES answer is obtained in step 11 meaning that the engine stop requirements are both met, the routine proceeds to step 12 wherein the engine stop mode is entered. The ECU 30 stops the injectors 15 from spraying the fuel and also stops the spark plugs from igniting the mixture in the engine 10 to stop the engine 10. Alternatively, if a NO answer is obtained in step 11, then the routine waits until the engine stop requirements are met.

After step 12 in which the engine stop mode is entered, the routine proceeds to step 13 wherein it is determined whether the engine restart requirements are met or not. Specifically, the ECU 30 determines whether the brake pedal is released or not based on the output from the brake sensor 33, and whether the accelerator pedal is depressed or not based on the output from the accelerator position sensor 31. If these conditions are both met, the ECU 30 determines that the engine 10 should be restarted.

If a YES answer is obtained in step 13 meaning that the engine restart requirements are met, then the routine proceeds to step 18 wherein the engine restart mode is entered to restart the engine 10. Specifically, the ECU 30 turns on the starter 16 to crank the engine 10 and energizes the injectors 15 and the spark plugs to spray and ignite the fuel in the engine 10. The ECU 30 does not perform the braking control mode to control the braking of the wheels 27 through the brake actuators 28 to permit the vehicle to run after the engine 10 is started. When the engine restart requirements have been met while the vehicle is running, the ECU 30 restarts the engine 10 while keeping the vehicle running, thereby minimizing a loss of kinetic energy of the vehicle. The routine then terminates.

If a NO answer is obtained in step 13 meaning that the engine restart requirements are not met, then the routine proceeds to step 14 wherein it is determined whether the speed DS of the vehicle, as calculated or determined by the vehicle speed determining circuit (i.e., a combination of the ECU 30 and the vehicle speed sensor 35), is zero (0) or not. The determined speed DS is, as described above, set to zero (0) when the value of the speed of the vehicle, as measured by the vehicle speed sensor 35, indicates 3 km/h or less. Therefore, there is a possibility that the determined speed DS shows zero (0), but a real speed RS of the vehicle is not zero (0).

If a NO answer is obtained in step 14 meaning that the measured speed DS is not zero, then the routine returns back to step 13 to determine whether the engine restart requirements are met or not. If the engine restart requirements are determined as having been met before the determined speed DS of the vehicle is found as being zero (0), then the routine proceeds to step 18 wherein the engine restart mode is, as described above, entered. Specifically, when the vehicle is running, and the engine restart requirements have been met, the ECU 30 restarts the engine 10 without controlling the braking of the wheels 27 through the brake actuators 28. The operations in steps 14 and 13 to determine whether the determined speed DS is zero or not and whether the engine restart requirements are met or not are executed by the ECU 30 cyclically at a high speed. Therefore, when the speed of the vehicle has dropped below 3 km, the ECU 30 finds or recognizes the determined speed DS as having become zero (0) immediately.

If a YES answer is obtained in step 14 meaning that the determined speed DS of the vehicle is recognized to be zero (0), then the routine proceeds to step 15 wherein the braking force smaller than the braking force TB2 is exerted by the brake actuators 28 on the wheels 27. Specifically, the ECU 70 applies to the wheels 27 a minimum braking force TB1 that is a minimum possible braking force the brake actuator 28 is permitted to exert on the wheel 27 for a constant period of time and then increases the minimum braking force TB1 gradually at a constant rate. Therefore, when the real speed RS of the vehicle is expected not to be zero (0), the ECU 30 works to decelerate the vehicle most slowly using the minimum braking force TB1 and then increase the minimum braking force TB1 at the constant rate to avoid a sudden increase in the braking force. At this time, the engine 10 has already been stopped in step 12, so that it is impossible to creep the vehicle forward. Therefore, there is no problem even when the ECU 30 keeps the vehicle stopped.

After step 15, the routine proceeds to step 16 wherein it is determined whether a given period of time T has elapsed or not since the braking force smaller than the braking force TB2 was applied to the wheels 27, that is, the determined speed DS reached zero (0). If a YES answer is obtained, then the routine proceeds to step 17 wherein the braking force TB2 is exerted on the wheels 27. If a NO answer is obtained meaning that the period of time T has not yet elapsed, then the routine repeats step 16. The period of time T is an experimentally derived time interval from when the determined speed DS reaches zero (0) to when the real speed RS of the vehicle is expected to have dropped to zero (0). In other words, a relation among the period of time for which the minimum braking force TB1 is applied to the wheels 27, the rate at which the minimum braking force TB1 is increased gradually, the period of time T, and the braking force TB2 is so determined that the real speed RS will be zero (0), and the braking force will be the braking force TB2 after a lapse of the period of time T since the minimum braking force TB1 continued to be applied to the wheels 27 for the constant period of time and then was increased gradually, and the determined speed DS decreased to zero (0).

In the above manner, the braking force TB2 is exerted on the wheels 27 to keep the vehicle stopped. The braking force TB2 is selected to be great enough to avoid the backward rolling of the vehicle when the driver starts to move the vehicle forward on the slope. In addition to such hill hold control, the ECU 30 is operable to apply the braking force TB2 to the wheels 27 to keep the vehicle stopped when the vehicle is on a horizontal surface of the road. If the engine restart requirements are met after the determined speed DS of the vehicle is recognized to be zero (0) in step 14, the ECU 30 continues to apply the braking force smaller than the braking force TB2 to the wheels 27 for the period of time T, then applies the braking force TB2 to the wheels 27 (i.e., steps 15 to 17), and restarts the engine 10 while keeping the braking force TB2 applied. This avoids a sudden deceleration of the vehicle unexpected by the driver and minimizes the degree of shock occurring when the engine 10 is restarted to move or accelerate the vehicle.

The above described braking control will also be explained with reference to FIGS. 3(a) to 3(d). A solid line indicates the determined speed DS of the vehicle. A broken line indicates the real speed RS of the vehicle.

The engine 10 is running, and the automatic transmission 14 is in the D range. At time t1, the driver depresses the brake pedal. The determined speed DS of the vehicle is identical with the real speed RS. Subsequently, the speed of the vehicle continues to drop. The engine stop requirements are met at time t2. The ECU 30 then enters, as demonstrated in FIG. 3(d), a fuel cut (F/C) mode to cut a supply of fuel to stop the engine 10 automatically.

Figure 3A:
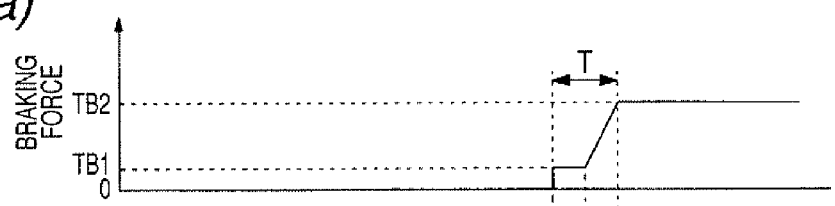
FIG. 3(a) is a view which demonstrates a change in braking force to be exerted on wheels of a vehicle.
Figure 3B:
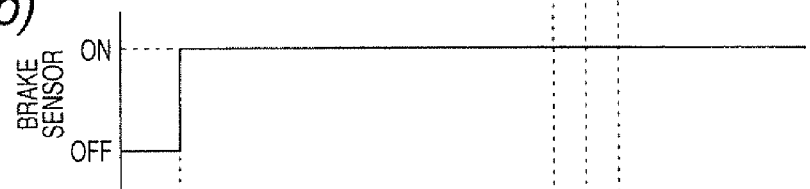
FIG. 3(b) is a view which demonstrates an output of a brake sensor indicating depression of a brake pedal.
Figure 3C:
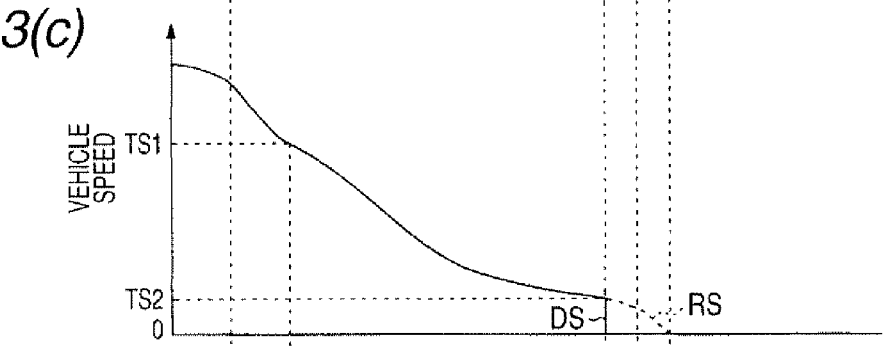
FIG. 3(c) is a view which demonstrates a change in speed of a vehicle.
Figure 3D:
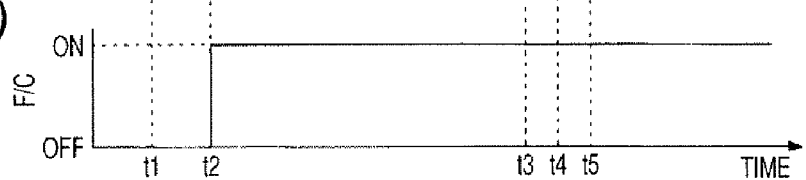
FIG. 3(d) is a view which demonstrates a fuel cut operation to which an engine of a vehicle is subjected.

When having dropped, as illustrated in FIG. 3(c), below the dead zone speed TS2 (e.g., 3 km/h) at time t3, the determined speed DS of the vehicle is, as indicated by a solid line, set to or becomes zero (0). The real speed RS is, as indicated by a broken line, not zero (0). Since the determined speed DS has become zero (0) while the engine 10 is stopped, the ECU 30 energizes the brake actuators 28 to exert the minimum braking force TB1 on the wheels 27 for the constant period of time (i.e., from time t3 to time t4). This causes the real speed RS of the vehicle to drop at a minimum possible rate.

Subsequently, the ECU 30 increases the braking force to be applied to the wheels 27 at a constant rate from time t4 to time t5. This causes the real speed RS to drop slightly faster than when the minimum braking force TB1 is applied to the wheels 27.

At time t5, the elapsed time from time t3 reaches the period of time T. Simultaneously, the braking force applied to the wheels 27 reaches the braking force TB2. Further, the real speed RS reaches zero (0) at time t5. After time t5, the braking force TB2 is exerted on the wheels 27 to keep the vehicle stopped.

When the engine restart requirements are met between time t3 and time t5, the ECU 30 controls the braking of the wheels 27 in the same manner as described above. Specifically, the ECU 30 applies the braking force TB2 to the wheel 27 and then restarts the engine 10.

The advantages, as offered by the vehicle control system, will be described below.

When the engine stop requirements are met while the engine 10 is running, the ECU 30 stops the engine 10 automatically. Subsequently, when the engine restart requirements are met, the ECU 30 restarts the engine 10. When the speed DS of the vehicle, as calculated by the ECU 30 based on the output from the vehicle speed sensor 35, has become zero (0), the ECU 30 energizes the brake actuators 28 to exert the braking force TB2 to the wheels 27 to keep the vehicle stopped. The dead zone where the determined speed DS of the vehicle is set to or inevitably become zero (0) is, as described above, provided near where the real speed RS of the vehicle is zero (0). Thus, when the real speed RS has dropped below the dead zone speed TS (e.g., 3 km/h) after the engine 10 is stopped automatically, the determined speed DS will become zero (0). At this time when the real speed RS does not yet become zero (0), the application of the braking force TB2 to the wheels 27 may result in sudden deceleration unanticipated by the driver.

In order to avoid the above drawback, the ECU 30 controls the brake actuators 28 to apply the braking force to the wheels 27 which is smaller in magnitude than the braking force TB2 when the determined speed DS has dropped to zero (0) following the automatic stop of the engine 10, thereby causing the vehicle to decelerate slowly. Subsequently, the ECU 30 applies the braking force TB2 to the wheels 27 to keep the vehicle stopped.

The ECU 30 continues to control the braking of the wheels 27 for the period of time T since the determined speed DS became zero (0). In other words, when there is a high possibility that the real speed RS of the vehicle has not yet dropped to zero (0), the ECU 30 works to perform the braking control to decelerate the vehicle slowly.

The period of time T for which the braking control is performed is set to the length of time from when the determined speed DS becomes zero (0) to when the real speed RS is expected to have dropped to zero (0). This enables the ECU 30 to decelerate the vehicle moderately until the real speed RS is expected to have dropped to zero (0) and then apply the braking force TB2 to the wheels, thereby avoiding the undesirable sudden deceleration of the vehicle and then keeping the vehicle stopped.

The braking force smaller than the braking force TB2 which is to be applied to the wheels 27 after the determined speed DS is set to zero (0) include includes the minimum braking force TB1 the brake actuator 28 is permitted to exert on the wheel 27, thus enabling the vehicle to be decelerated as gradually as possible to minimize the undesirable deceleration of the vehicle further.

While the present invention has been disclosed in terms of the preferred embodiment in order to facilitate better understanding thereof, it should be appreciated that the invention can be embodied in various ways without departing from the principle of the invention.

For example, while when the speed DS of the vehicle is decided to be zero (0), the ECU 30 applies the braking force which is smaller than the braking force TB2 to the wheels 27, the condition of commencing such braking control may include the depression of the brake pedal.

Figure 4A:
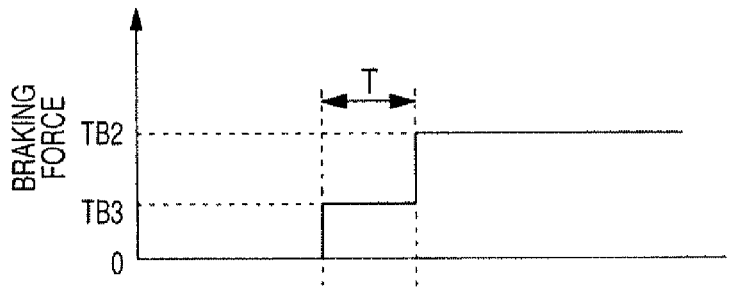
FIG. 4(a) is a view which illustrates a change in braking force to be exerted on wheels of a vehicle in a modification of a vehicle control system of the invention.
Figure 4B:
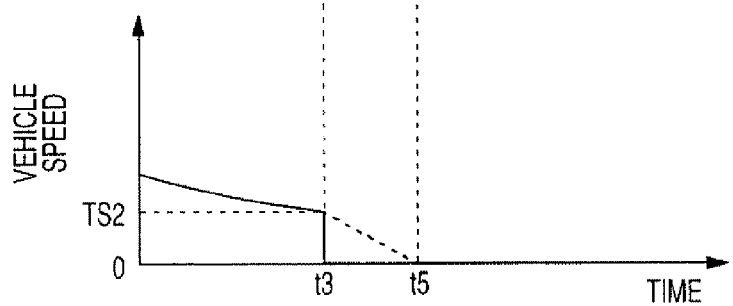
FIG. 4(b) is a view which illustrates a change in speed of a vehicle.

The ECU 30 works to apply the minimum braking force TB1 to the wheels 27 through the actuators 28 for the constant period of time and then increases it at the constant rate, but the ECU 30 may apply, as illustrated in FIGS. 4(a) and 4(b), the braking force TB3 which is greater than the minimum braking force 7731 and smaller than the braking force TB2 to the wheels 27 for the period of time T. In this case, the period of time T may be set to the interval between time t3 at which the determined speed DS is set to zero (0) and time t5 at which the real speed RS is expected to have dropped to zero (0). When the time t5 is reached, the ECU, like in the above embodiment, applies the braking force TB2 to the wheels 27. This modification results in ease of determining the period of time T experimentally and facilitates the execution of the braking control task in the ECU 30.

Figure 5A:
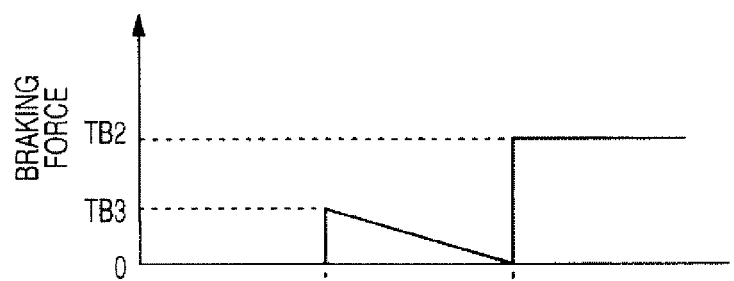
FIG. 5(a) is a view which illustrates a change in braking force to be exerted on wheels of a vehicle in a second modification of a vehicle control system of the invention.
Figure 5B:
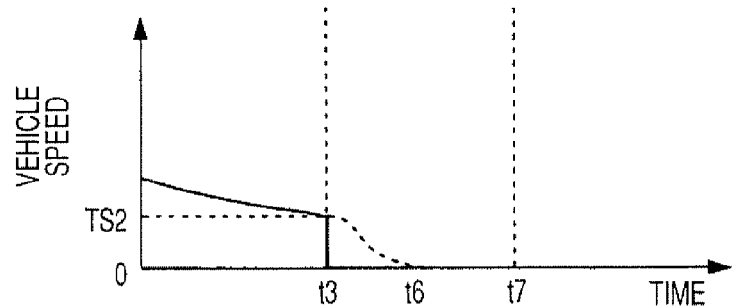
FIG. 5(b) is a view which illustrates a change in speed of a vehicle.

The ECU 30 may alternatively be, as illustrated in FIGS. 5(a) and 5(b), designed to apply the intermediate braking force TB3 to the wheels 27 at time t3 when the determined speed DS is set to zero (0) and then decrease it gradually. This causes the braking force used to decelerate the vehicle to be decreased moderately with a decrease in the real speed RS of the vehicle, thereby decelerating the vehicle more gradually. The braking force may be applied to the wheels 27 until time t7 following time t6 at which the real speed RS drops to zero (0). This enables the braking force TB2 to be applied to the wheels 27 after the vehicle is expected to have stopped completely, thus eliminating the unanticipated sudden deceleration of the vehicle. The ECU 30 may also be designed to stop applying the braking force to the wheels 27 before time t5 or time t6 when the real speed RS is expected to have reached zero (0).

In any of the stop hold mode, the start control mode, and the restart control mode, the ECU 30 applies the braking force to the wheels 27 which is smaller in magnitude than the braking force TB2 and then applies the braking force TB2 to the wheels 27. However, when the driver's effort on the brake pedal is great and/or the engine restart requirements are met, the ECU 30 may apply the braking force TB2 to the wheels 27 immediately. In this case, the ECU 20 may increase the braking force or restart the engine 10 in preference to other control tasks as the situation demands.

The braking force TB2 is kept constant in the stop hold mode and the start control mode, but however, it may be determined based on the running condition of the vehicle and/or the operating condition of the engine 10 or alternatively altered with time. In this case, the ECU 30 applies the braking force smaller than the braking force TB2 to the wheels 27 after the determined speed DS is set to zero (0).

What is claimed is:

1. A vehicle control system comprising:
   a brake actuator which works to brake a wheel of a vehicle which has an automatic transmission with a torque converter mounted therein;
   a vehicle speed determiner which works to determine a speed of the vehicle, said vehicle speed determiner having a dead zone around where a real speed of the vehicle is zero, said vehicle speed determiner having a characteristic in which when falling in the dead zone, the determined speed of the vehicle shows zero when the real speed of the vehicle is non-zero; and
   a controller which operates in a stop mode, a restart mode, and a braking control mode, selectively; wherein:
      when a given engine stop requirement is met during running of an engine of the vehicle, said controller entering the stop mode to stop the engine automatically;
      when a given engine restart requirement is met after stop of the engine, said controller entering the restart mode to restart the engine;
      when the determined speed of the vehicle has become zero following the stop of the engine in the stop mode, said controller entering the braking control mode to constantly apply a first braking force to the wheel for a predetermined period of time, the predetermined time starting when the determined speed of the vehicle becomes zero and ending about half-way in a time period between a time when the determined speed of the vehicle becomes zero and a time when the real speed of the vehicle becomes zero; and
      after the predetermined period of time has elapsed, said controller applies a second braking force to the wheel through said brake actuator which is greater than the first braking force.

2. A vehicle control system as set forth in claim 1, wherein said controller continues to provide a braking force after it has been required to restart the vehicle on a slope after entering restart mode.

3. A vehicle control system as set forth in claim 1, wherein said predetermined period of time is a time interval from when the determined speed becomes zero to when the real speed is expected to have dropped to zero.

4. A vehicle control system as set forth in claim 1, wherein said first braking force is a minimum possible braking force said brake actuator is permitted to exert on the wheel.

5. A vehicle control system as set forth in claim 1, wherein said controller starts to apply the second braking force to the wheel when the real speed of the vehicle is expected to have dropped to zero, and wherein said controller starts to apply the first braking force to the wheel before the real speed of the vehicle is expected to have dropped to zero.

6. A vehicle control system as set forth in claim 1, wherein when the determined speed is zero, and the vehicle has been required to start on a slope, said controller having the vehicle start moving while the second braking force is being applied to the wheel.

7. A vehicle control system as set forth in claim 1, wherein when the determined speed is zero, and it has been required to restart the engine, said controller having the engine restart while the second braking force is being applied to the wheel.

8. A vehicle control system as set forth in claim 1, wherein after the controller applies the first braking force, the controller gradually increases the first braking force.

9. A vehicle control system as set forth in claim 1, wherein said given engine stop requirement includes the brake pedal being depressed by the driver by a predetermined amount.

10. A vehicle control system as set forth in claim 1, wherein said given engine stop requirement includes the speed of the vehicle dropping below a given idle stop speed.

11. A vehicle control system as set forth in claim 1, wherein said given engine restart requirement includes the brake pedal not being depressed.

12. A vehicle control system as set forth in claim 1, wherein the controller causes the brake pedal to depress after applying a braking force.

13. A vehicle control system as set forth in claim 1, wherein the controller decreases the predetermined period of time when the brake pedal is depressed by the driver by a given amount.

14. A method for automatically applying a braking force to a wheel of a vehicle which has an automatic transmission with a torque converter mounted therein, said method comprising:
   determining the speed of the vehicle wherein a speed detector used to determine the speed of the vehicle has a dead zone around where a real speed of the vehicle is zero, the speed detector has a characteristic in which when falling in the dead zone, the determined speed of the vehicle shows zero when the real speed of the vehicle is non-zero;
   entering an engine stop mode when an automatic engine stop requirement is met;
   entering an engine restart mode when an engine restart requirement is met;
   constantly applying a first braking force for a predetermined period of time to a wheel, the predetermined time starting when the determined speed of the vehicle becomes zero and ending about half-way in a time period between a time when the determined speed of the vehicle becomes zero and a time when the real speed of the vehicle becomes zero;

measuring the time elapsed after applying the first braking force; and applying a second braking force to the wheel after the predetermined time.

15. The method of claim 14, further comprising continuing to provide a braking force after entering the engine restart mode when the vehicle is on a hill.

16. The method of claim 14, further comprising gradually increasing the first braking force.

17. The method of claim 14, further comprising causing the brake pedal to depress after applying a braking force.

* * * * *